Figure 1:
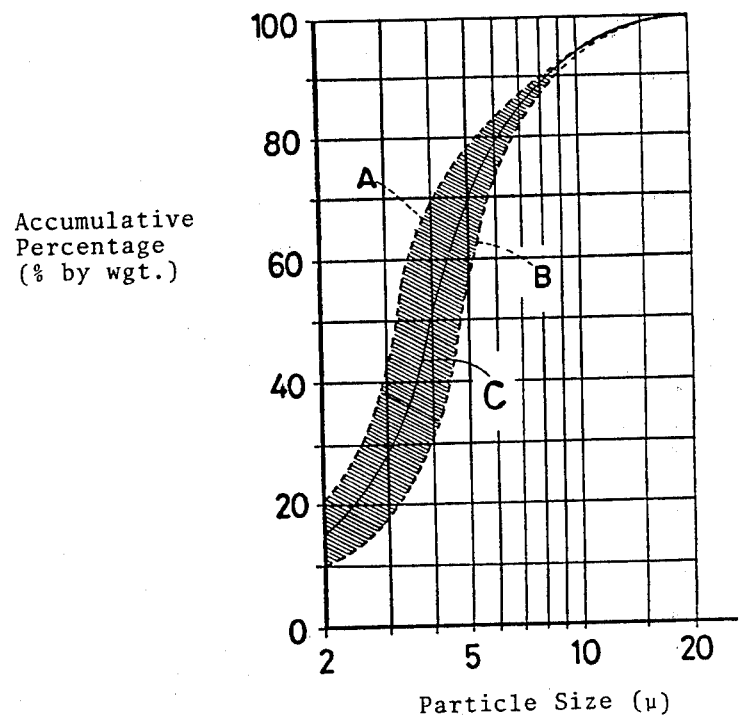

United States Patent [19]

Uetani et al.

[11] 4,247,606
[45] Jan. 27, 1981

[54] SILVER OXIDE CELL AND ITS MANUFACTURE

[75] Inventors: Yoshio Uetani; Akio Shimizu; Kozo Kajita; Osamu Yumimoto; Satoru Kuwano, all of Osaka, Japan

[73] Assignee: Hitachi Maxell, Ltd., Osaka, Japan

[21] Appl. No.: 94,550

[22] Filed: Nov. 15, 1979

Related U.S. Application Data

[63] Continuation of Ser. No. 887,325, Mar. 16, 1978, abandoned.

[51] Int. Cl.³ .................................................. H01M 6/06
[52] U.S. Cl. ...................................... 429/91; 429/206; 429/219; 429/224; 429/229
[58] Field of Search ................... 429/219, 224, 91, 90, 429/60, 61, 229

[56] References Cited

U.S. PATENT DOCUMENTS

| | | | |
|---|---|---|---|
| 3,057,942 | 10/1962 | Smith et al. | 429/60 |
| 3,170,819 | 2/1965 | Abramson | 429/60 |
| 3,294,590 | 12/1966 | Solomon | 429/219 X |
| 3,520,729 | 7/1970 | Voss et al. | 429/219 |
| 3,757,793 | 9/1973 | Fester et al. | 429/219 X |

FOREIGN PATENT DOCUMENTS

| | | | |
|---|---|---|---|
| 703063 | 2/1965 | Canada | 429/219 |
| 705979 | 3/1965 | Canada | 429/219 |

*Primary Examiner*—Anthony Skapars
*Attorney, Agent, or Firm*—Birch, Stewart, Kolasch & Birch

[57] ABSTRACT

A silver oxide cell which comprises a positive electrode comprising a shaped body of silver oxide as a main positive active material, a negative electrode and an alkaline electrolyte, characterized in that the shaped body is a molded product of a composition comprising particles of silver oxide and particles of manganese dioxide, both particles having a certain particle size distribution, so that a detectable voltage difference is produced prior to complete consumption of the discharge capacity of the cell, whereby the termination of the discharge capacity of the cell can be anticipated.

7 Claims, 6 Drawing Figures

SILVER OXIDE CELL AND ITS MANUFACTURE

This application is a continuation of copending application Ser. No. 887,325, filed on Mar. 16, 1978, now abandoned.

The present invention relates to a silver oxide cell and its manufacture. More particularly, it relates to improvements in primary silver oxide cells comprising silver oxide as a main positive active material, zinc as a negative active material and an alkaline electrolyte.

Conventional primary silver oxide cells of said type maintain a constant terminal voltage up to the final stage of discharge and, when said final stage is reached, the voltage is suddenly and abruptly lowered. From the viewpoint of the complete utilization of the discharge capacity of the cell, this phenomenon appears to be quite advantageous. However, it is difficult to anticipate the final stage of the discharge, and therefore various disadvantages are produced. For example, since the time for exchange of the cell is indefinite, the discharge capacity may come to an end during the operation of equipment within which the cell is incorporated, whereby the efficient and continuous functioning of the equipment is hindered. Further, for example, leaving the cell in equipment at its final stage of discharge for a long period of time may cause the leakage of the electrolyte in the cell, whereby equipment can be damaged.

The production of a detectable voltage difference (or voltage drop) at the final stage of discharge by incorporating into a positive electrode body a metal oxide having a standard oxidation reduction potential lower than that of silver oxide as the positive active material may overcome said drawbacks. Among various metal oxides, manganese dioxide is particularly useful for such purpose in producing a definite voltage difference which is detectable by an ordinary detection circuit.

Unfortunately, however, the incorporation of particles of manganese dioxide into a positive electrode body results in the deterioration of the molding property so that the resulting positive electrode body tends to become broken or, even if not broken, frequently develops many cracks on its surface. When such a positive electrode body containing cracks is assembled in a cell, the alkaline electrolyte retained in an absorber in the cell penetrates through the cracks into the positive electrode body so that the electrolyte in the absorber or the negative electrode becomes deficient, whereby the function and capacity of the cell greatly deteriorates. Further, the penetration of the electrolyte into the positive electrode body lowers its mechanical strength and causes the electrolyte to look from the cell.

In order to prevent such drawbacks caused by the incorporation of manganese dioxide into a positive electrode body, an extensive study has been carried out. As the result, it has been found that the use of silver oxide having a certain particle size distribution and the adjustment of the particle size distribution of manganese dioxide thereto can avoid said drawbacks and affords a positive electrode body of excellent function and capacity.

According to the present invention, there is provided a silver oxide cell which comprises a positive electrode comprising a shaped body of silver oxide as a main positive active material, a negative electrode comprising a negative active material and an alkaline electrolyte, characterized in that the shaped body is a molded product of a composition comprising particles of silver oxide and particles of manganese dioxide, the particle size distribution of both of said particles being not less than 90% of particles of not more than $10\mu$ in particle size and not less than 60% of particles of not more than $5\mu$ in particle size, so that a detectable voltage difference is produced prior to complete consumption of the discharge capacity of the cell, whereby the termination of the discharge capacity of the cell can be anticipated. Advantageously, said shaped body has a good molding properties and a favorable mechanical strength so that the cell assembled therewith can maintain excellent function and capacity on storage.

In the silver oxide cell of this invention, the positive electrode comprises a shaped body, which is a molded product of a composition comprising particles of silver oxide and particles of manganese dioxide. As the main positive active material, there is used silver oxide, of which examples are silver(I) oxide, silver(II) oxide, mixture thereof, etc.

The metal oxide to be incorporated into the shaped body for production of a voltage difference is manganese dioxide. As a principle, any metal oxide having a lower standard oxidation-reduction potential than silver oxide as the main positive active material may be used for the said purpose. Examples of the metal oxide are manganese dioxide ($MnO_2$), $HgO$, $CuO$, $Bi_2O_3$, $PbO_2$, etc. However, some of them show a low voltage of discharge so that a certain special circuit is needed for detection of such low voltage. Further, some of them produce a slight voltage difference, and a circuit for detection sometimes does not work properly. Accordingly, manganese dioxide and $HgO$ have been confirmed to be properly acceptable for the said purpose, and due to the economy and safety, the use of manganese dioxide is particularly recommended.

Both the particles of silver oxide and the particles of manganese dioxide are required to have the following particle size distribution: not more than $10\mu$, not less than 90% by weight; not more than $5\mu$, not less than 60% by weight. Insofar as the said particle size distribution is maintained, no particular limitation is present on the lower limit of the average particle size; but the average particle size may be usually not less than $0.01\mu$, preferably not less than $0.2\mu$. When the particle size distribution is not within the said range, i.e. the particles are coarser, the molding property of the resulting composition is inferior so that the shaped body formed therewith by compression molding tends to be broken. Thus, the operation efficiency on the molding operation is substantially lowered. In addition, the shaped body frequently develops cracks on its surface, into which the electrolyte maintained in an absorber, penetrates and deteriorates the function and capacity of the cell.

The content of manganese dioxide should not be more than 20% by weight based on the weight of the shaped body. Usually, the manganese dioxide content is not less than 1% by weight. When the manganese dioxide content exceeds said upper limit, the amount of silver oxide as the main positive active material is decreased, and the electroconductivity of the positive electrode is lowered. Thus, the cell characteristics become inferior. In addition, a higher amount of manganese dioxide makes the positive electrode fragile. When the manganese dioxide content is less than the said lower limit, the voltage difference is indefinite, and its detection becomes difficult. In general, it is recommended to keep the manganese dioxide content in the positive electrode body not more than about 17% by weight and not less than about 3% by weight.

Table 1 shows the duration of the discharge observed in a silver oxide cell (I) produced by the use of a positive electrode body containing about 15% by weight of manganese dioxide whose particle size distribution is such that 93% of the particles have a particle size of 10μ or less and 70% of the particles have a particle size of 5μ or less, the average particle size being about 4μ, and a silver oxide cell (II) same type produced by the use of a positive electrode body containing about 15% by weight of manganese dioxide whose particle size distribution is such that 82% of the particles have a particle size of 50μ or less and 60% of the particles have a particle size of 30μ or less, the average particle size being about 25μ, when they are maintained at 60° C. for 1 month and then made to discharge under a load resistance of 2 kω.

TABLE 1

|  | Duration of discharge (Hrs) |
| --- | --- |
| Silver oxide cell (I) | 160 |
| Silver oxide cell (II) | 148 |

The relationship between the particle size distributions of silver oxide to be used for formation of the shaped body and of manganese dioxide to be incorporated therein is shown in FIG. 1 of the accompanying drawings, wherein the accumulative percentage (% by weight) is indicated on the axis of ordinate and the particle size (μ) is indicated on the axis of abscissa. In this Figure, the hatched region between the two curves (A) and (B) shows the particle size distribution of silver oxide as preferably used, and the curve (C) indicates the particle size distribution of manganese dioxide used in the preparation of the silver oxide cell (I).

Figure 2:
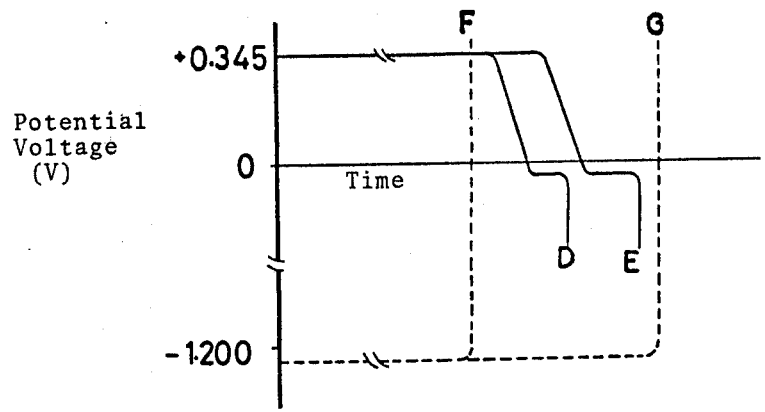
Figure 3:
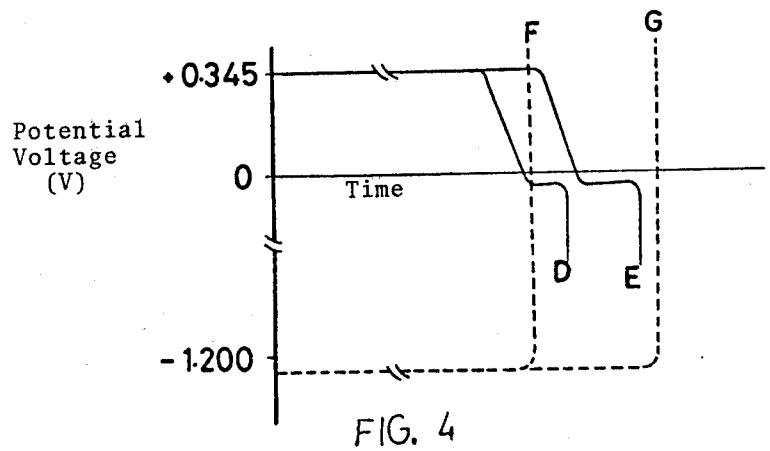

By incorporating manganese dioxide into the positive electrode body a two step-potential can be obtained at the final stage of the discharge of the positive electrode. When the mixing proportion is not regulated, however, the final stage of the discharge of the cell may not be foreknown certainly, or hydrogen gas may generate from the positive electrode when the cell is discharged excessively. Such conditions are illustrated in FIGS. 2 and 3 of the accompanying drawings, which show the variations of the discharge capacities of the positive electrode and the negative electrode in a cell which comprises a shaped body of a composition comprising silver(I) oxide and manganese dioxide as the positive electrode and zinc as the negative active material. The curves (D) and (E) indicate the discharge characteristics of the positive electrode, and the curves (F) and (G) indicate that of the negative electrode. The regions between (D) and (E) and between (F) and (G) show the variations of the discharge capacity in each of the electrodes. In case of the combination of the positive electrode having the characteristics of the curve (D) with the negative electrode having the characteristics of the curve (F) in FIG. 2, the discharge at the negative electrode comes to an end before the completion of the discharge of silver oxide at the positive electrode so that, even with incorporation of manganese dioxide into the positive electrode body, foreknowing of the final stage of the discharge by means of the voltage difference is impossible. In case of the combination of the positive electrode having the characteristics of the curve (D) with the negative electrode having the characteristics of the curve (G), the voltage difference can be anticipated, because dischargeable zinc remains in the negative electrode at the time when the discharge of silver oxide is replaced by that of manganese dioxide. But, dischargeable zinc still remains in the negative electrode after completion of the discharge at the positive electrode, so that hydrogen gas is generated from the positive electrode at the final stage of the discharge of the cell.

Tables 2 and 3 show the relationship of the voltage difference or the gas generation at the final stage of the discharge with various combination of the electrodes shown in FIGS. 2 and 3.

TABLE 2

| (Combination shown in FIG. 2) | | | |
| --- | --- | --- | --- |
| Sample No. | Combination of electrodes | Voltage difference | Gas generation |
| 1 | (D) - (F) | Not occurred | Not occurred |
| 2 | (D) - (G) | Occurred | Occurred |
| 3 | (E) - (F) | Not occurred | Not occurred |
| 4 | (E) - (G) | Occurred | Occurred |

TABLE 3

| (Combination shown in FIG. 3) | | | |
| --- | --- | --- | --- |
| Sample No. | Combination of electrodes | Voltage difference | Gas generation |
| 5 | (D) - (F) | Occurred | Not occurred |
| 6 | (D) - (G) | Occurred | Occurred |
| 7 | (E) - (F) | Not occurred | Not occurred |
| 8 | (E) - (G) | Occurred | Occurred |

It is obvious from these tables that, when the discharge capacity of the negative electrode is smaller than that of silver(I) oxide in the positive electrode as in Sample Nos. 1, 3 and 7, the voltage difference is unknowable even with incorporation of a metal oxide into the positive electrode. When the discharge capacity of the negative electrode is larger than the total discharge capacity of silver(I) oxide and manganese dioxide in the positive electrode as in Samples Nos. 2, 4, 6 and 8, hydrogen gas is generated from the positive electrode at the final stage of the discharge. The gas generated here can be extinguished only with difficulty in the cell, and the increase of the gas pressure causes leakage of the electrolyte and deformation or rupture of the cell. Therefore, the gas generation must be avoided for a certainty. For making it possible to know the voltage difference and preventing the gas generation at the same time, the cell is required to have such a constitution that the discharge at the negative electrode comes to an end after the shifting from the discharge of silver oxide to that of manganese dioxide in the positive electrode and before the completion of the discharge of the positive electrode as in Sample No. 5.

From the results of the experiments as mentioned above and in consideration of the variation of the discharge capacity of the electrodes, it has been found that foreknowing of the final stage of the discharge and prevention of the gas generation can be attained certainly at the same time by regulating the proportion of the negative active material (i.e. zinc) and the positive active materials (i.e. silver oxide and manganese dioxide) so as to satisfy the following two inequalities:

$$[Zn]_{min} > [Ag.O]_{max}$$

$$[Zn]_{max} < [Ag.O + MnO_2]_{min}$$

wherein $[Zn]_{min}$ is a minimum value in the variation of the discharge capacity of the zinc, $[Zn]_{max}$ is a maximum value in the variation of the discharge capacity of the zinc, $[Ag.O]_{max}$ is a maximum value in the variation of the discharge capacity of the silver oxide and $[Ag.O+MnO_2]_{min}$ is a minimum value in the variation of the total discharge capacity of the silver oxide and the manganese dioxide.

Figure 4:
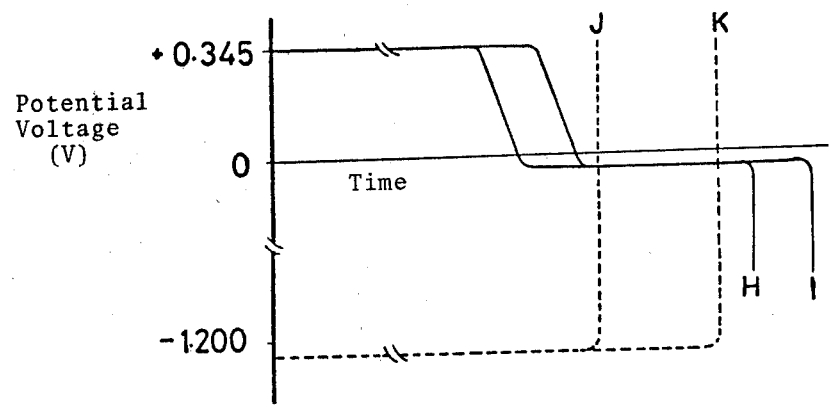

FIG. 4 of the accompanying drawings shows the discharge characteristics of a cell being under regulation on the basis of the said inequalities. The curves (H) and (I) indicate the discharge characteristics of the positive electrode, and the curves (J) and (K) indicate the discharge characteristics of the negative electrode. The regions between (H) and (I) and between (J) and (K) are the ranges of the variation of the discharge capacity at each of these electrodes.

In the positive electrode incorporated with manganese dioxide, the degree or extent of the permeation or penetration of the electrolyte is larger, compared with the positive electrode not incorporated with the same, owing to the properties of the particles of manganese dioxide. Therefore, in a cell comprising such a positive electrode, the electrolyte contained in the negative electrode removes gradually into the positive electrode body, and because of its deficiency in the negative electrode, passivation of zinc is promoted. At the same time, an excess amount of the electrolyte permeates into the positive electrode body to make it swell, and the contact between the particles in the positive electrode body becomes loose, which results in deterioration of the capacity of the cell.

It may be possible for overcoming such drawbacks to supply to the negative electrode or the absorber the electrolyte in an excess amount in consideration of its removal to the positive electrode. But this is not desirable, because the excessive electrolyte is forced out at the time of sealing of the cell to cause leakage.

According to the present invention, the increase of permeation of the electrolyte caused by the incorporation of manganese dioxide can be prevented by regulating the packing density of the positive electrode.

Table 4 shows the swelling rate, in the height, of the middle portion of the positive electrode of a button type silver oxide cell after stored for 3 months, the said button type silver oxide cell being assembled by the use of a positive electrode being about 11 mm in diameter and about 1.3 mm in height and having a varied packing density, which is prepared by compression molding a mixture comprising silver oxide having such a particle size distribution that 93% of the particles have a particle size of 10μ or less and 70% of the particles have a particle size of 5μ or less, the average particle size being about 4μ (450 parts by weight), manganese dioxide having the same particle size as that of the silver oxide (80 parts by weight) and flake-like graphite of 2000 mesh (30 parts by weight).

TABLE 4

| Packing density (g/cm³) | Swelling rate (%) |
|---|---|
| 3 | 18–22 |
| 4 | 10–14 |
| 4.5 | 5–7 |
| 5.0 | 1–3 |

It is understood from this table that, when the packing density of the positive electrode is about 4.5 g/cm³ or more, swelling of the positive electrode due to the permeation of the electrolyte is negligibly small, and close contact between the particles of the positive electrode is always maintained. Usually, a positive electrode incorporated with manganese dioxide is fragile and may chip during handling or crumble by the pressure of sealing of the cell. But, by maintaining the packing density of the positive electrode to about 4.5 g/cm³ or more, such troubles are not caused even when manganese dioxide is incorporated.

Practical and presently preferred embodiments of the present invention are illustratively shown in the following Examples wherein % and part(s) are by weight.

EXAMPLE 1

Figure 5:
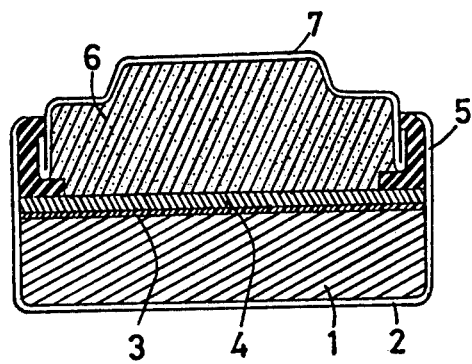

A schematic sectional view of an embodiment of the silver oxide cell of the invention is shown in FIG. 5 of the accompanying drawings.

Silver(I) oxide (particle size distribution: not more than 10μ, 93%; not more than 5μ, 75%) having an average particle size of about 3μ, manganese dioxide (particle size distribution: not more than 10μ, 93%; not more than 5μ, 70%) having an average particle size of about 4μ and graphite of 2000 mesh are mixed uniformly in a weight proportion of 45:8:3, and the resultant mixture is compression molded under a pressure of 6 ton/cm² to give a molded product (i.e. a positive electrode body) in a round plate shape.

The above prepared positive electrode body (1) is inserted into the bottom of a positive can (2), and a separator film (3) made of polyethylene graft polymerized with acrylic acid or methacrylic acid and an absorber of non-woven fabric (4) made of Vinylon fibers or Nylon fibers were placed thereon in this order. A plastic gasket (5) having a section of L-letter form is fit into the opening of the positive can (2), and a designed amount of an alkaline electrolyte is immersed into the absorber (4).

Separately, a negative electrode (6) comprising a mixture of zinc powder of 35 to 150 mesh and an alkaline electrolyte in a weight proportion of 15:12 is charged in a negative can (7), which is inserted into the gasket (5). The opening of the positive can (2) is then bent inward, whereby a button type silver oxide cell as shown in FIG. 5 is obtained.

In the thus obtained cell, the positive active material has a discharge capacity of about 100 mAH, the manganese dioxide incorporated into the positive electrode has a discharge capacity of about 25 mAH and the negative active material has a discharge capacity of about 110 mAH. The manganese dioxide content in the positive electrode is about 14% by weight. The packing density of the positive electrode is about 5.0 g/cm³.

EXAMPLE 2

Figure 6:
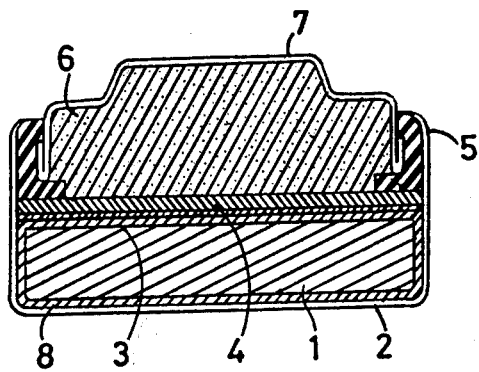

A schematic sectional view of another embodiment of the silver oxide cell of the invention is shown in FIG. 6 of the accompanying drawings.

Silver(I) oxide and manganese dioxide as used in Example 1 but without graphite are mixed uniformly in a weight proportion of 45:8, and the resulting mixture is compression molded under a pressure of 6 ton/cm² to give a molded product (i.e. a positive electrode body) in a round plate shape.

In the same manner as in Example 1, a silver oxide cell is constructed using the positive electrode body as prepared above. Then, the cell is subjected to preliminary discharge under a load of 2ω for a period of 60 seconds so as to form a metal silver layer (8) on the surface of the positive electrode body (1) at the side contacting with the positive can (2) and the separator film (3).

After the preliminary discharge, the capacity of the positive active material and the manganese dioxide incorporated into the positive electrode are respectively about 97 mAH and about 25 mAH. The capacity of the negative active material is about 107 mAH. The manganese dioxide content in the positive electrode is about 15% by weight. The packing density of the positive electrode is about 5.5 g/cm$^3$.

In the same manner as above but using silver(II) oxide instead of silver(I) oxide, there are obtainable silver oxide cells comprising silver(II) oxide as the positive active material. When desired, the positive electrode may be reduced by a per se conventional procedure to form a layer of silver(I) oxide on the surface, whereby the voltage difference at the initial stage of discharge can be eliminated.

As explained above, the silver oxide cell of the present invention makes it possible to foreknow surely the final stage of discharge. Therefore, the cell can be exchanged in an equipment prior to complete consumption of the discharge capacity, and the normal operation of the equipment can be assured with prevention of any damage by leakage due to excessive discharge. Further, the positive electrode can be readily shaped or molded and maintain an excellent discharge characteristics without any material deterioration in function and capacity on storage.

What is claimed is:

1. A primary silver oxide cell which comprises a positive electrode comprising a shaped body of silver oxide as a positive active material, a negative electrode comprising a negative active material and an alkaline electrolyte, characterized in that the shaped body is a molded product of a composition comprising particles of silver oxide and particles of manganese dioxide, the particle size distribution of both of said particles being not less than 90% of particles of not more than 10$\mu$ in particle size and not less than 60% of particles of not more than 5$\mu$ in particle size, and said shaped body having a packing density of not less than 4.5 g/cm$^3$, whereby a detectable voltage difference is produced prior to complete consumption of the discharge capacity of the cell.

2. The silver oxide cell according to claim 1, wherein the main positive active material is silver(I) oxide or silver(II) oxide, or mixture thereof.

3. The silver oxide cell according to claim 1, wherein the negative active material is zinc.

4. The silver oxide cell according to claim 1, wherein the content of manganese dioxide is not more than 20% by weight based on the weight of the shaped body.

5. The silver oxide cell according to claim 4, wherein the content of manganese dioxide is not less than 1% by weight based on the weight of the shaped body.

6. The silver oxide cell according to claim 5, wherein the content of manganese dioxide is from 3 to 17% by weight based on the weight of the shaped body.

7. The silver oxide cell according to claim 1, wherein the weight proportion of the silver oxide, the manganese dioxide and zinc as the negative active material is controlled to satisfy the following two inequalities:

$$[Zn]_{min} > [Ag.O]_{max}$$

$$[Zn]_{max} < [Ag.O + MnO_2]_{min}$$

wherein $[Zn]_{min}$ is a minimum value in the variation of the discharge capacity of the zinc, $[Zn]_{max}$ is a maximum value in the variation of the discharge capacity of the zinc, $[Ag.O]_{max}$ is a maximum value in the variation of the discharge capacity of the silver oxide and $[Ag.O + MnO_2]_{min}$ is a minimum value in the variation of the total discharge capacity of the silver oxide and the manganese dioxide.

* * * * *

UNITED STATES PATENT AND TRADEMARK OFFICE
CERTIFICATE OF CORRECTION

PATENT NO. : 4,247,606
DATED : January 27, 1981
INVENTOR(S) : Uetani et al

It is certified that error appears in the above—identified patent and that said Letters Patent is hereby corrected as shown below:

After "[22] Filed: Nov. 15, 1979"

the following category should be inserted:

-- [30] Foreign Application Priority Data

Jun. 20, 1977 [JP] Japan ...... 73725/1977 --

Signed and Sealed this

Sixteenth Day of June 1981

[SEAL]

*Attest:*

RENE D. TEGTMEYER

*Attesting Officer*     *Acting Commissioner of Patents and Trademarks*